United States Patent [19]

Oglesbee et al.

[11] Patent Number: 5,754,027
[45] Date of Patent: May 19, 1998

[54] BATTERY PACK AND ASSOCIATED CHARGING SYSTEM

[75] Inventors: John W. Oglesbee, Watkinsville; Robert W. McGinnis, Grayson, both of Ga.

[73] Assignee: Motorola, Inc., Schaumburg, Ill.

[21] Appl. No.: 676,791

[22] Filed: Jul. 8, 1996

[51] Int. Cl.[6] ................................ H01M 10/46
[52] U.S. Cl. ...................... 320/5; 320/39; 320/35
[58] Field of Search ................... 320/5, 9, 11, 12, 320/13, 14, 27, 29, 30, 39, 40, 35, 49

[56] References Cited

U.S. PATENT DOCUMENTS

| | | | |
|---|---|---|---|
| 4,965,738 | 10/1990 | Bauer et al. | 320/39 X |
| 5,150,031 | 9/1992 | James et al. | 320/2 |
| 5,206,097 | 4/1993 | Burns et al. | 429/90 |
| 5,325,040 | 6/1994 | Bogut et al. | 320/39 X |
| 5,471,128 | 11/1995 | Patino et al. | 320/13 |
| 5,534,765 | 7/1996 | Kreisinger et al. | 320/30 |
| 5,541,490 | 7/1996 | Sengupta et al. | 320/14 |
| 5,602,460 | 2/1997 | Fernandez et al. | 320/30 |
| 5,606,241 | 2/1997 | Patino et al. | 320/48 |

*Primary Examiner*—Eward H. Tso
*Attorney, Agent, or Firm*—Scott M. Garrett; Kelly A. Gardner

[57] ABSTRACT

A battery pack (12) comprises current sensor (28) for sensing the charge current through a battery cell (26), and generating a DC voltage which is sensed by a charger (14). The charger can then provide an output current that satisfies both the need for a constant charge current through the battery cell or cells, and the varying current demand of a load (10). Additionally, the battery pack may include a switch (34) for removing the current sensor from the discharge path of the battery cell or cells and the load when the battery pack is not connected to the charger.

21 Claims, 6 Drawing Sheets

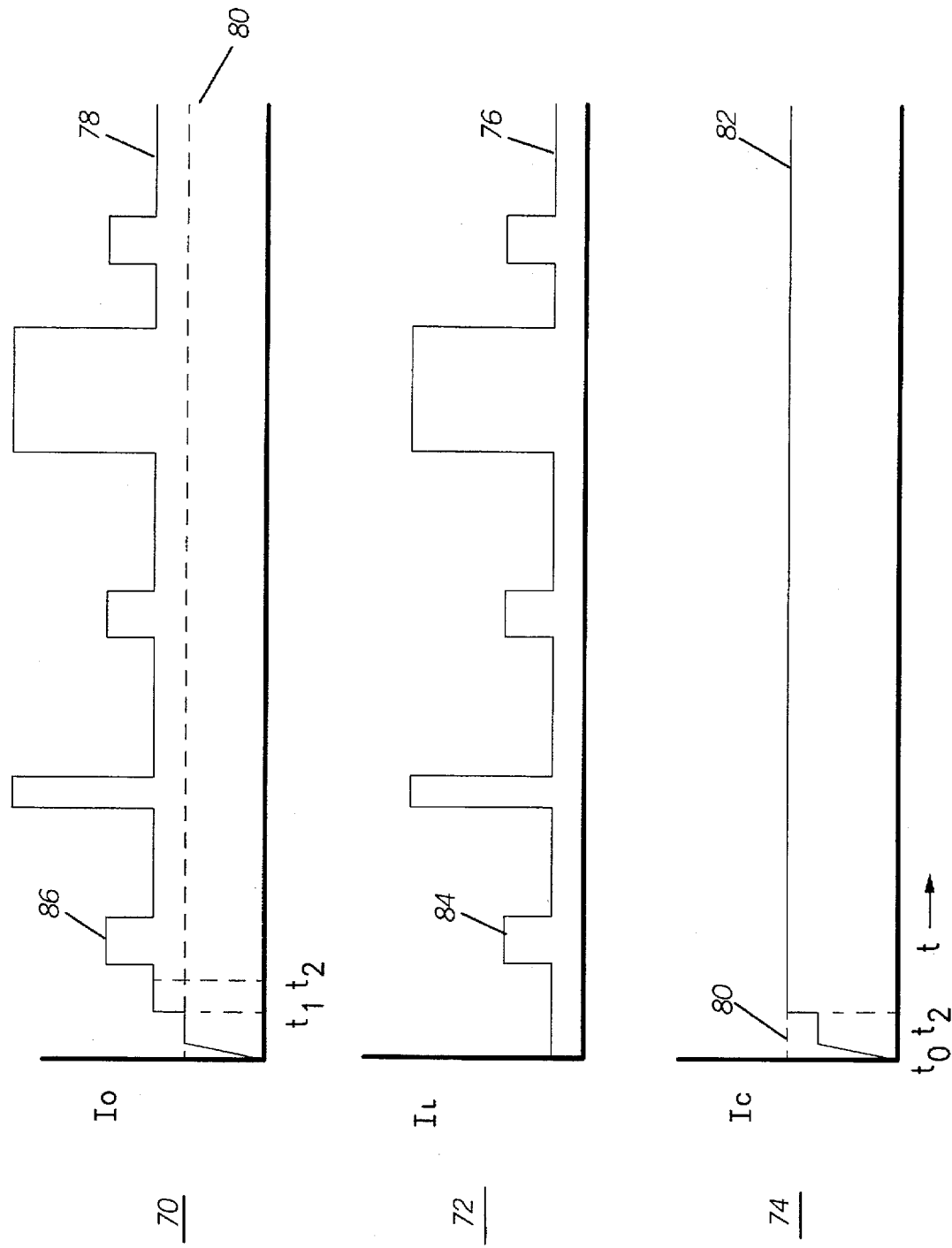

BATTERY PACK AND ASSOCIATED CHARGING SYSTEM

TECHNICAL FIELD

The inventions relates in general to battery charging systems, and particularly to battery charging systems in which a battery is recharged while powering a changing load.

BACKGROUND

Battery charging systems have long been used for portable electrical and electronic devices. The economics of using rechargeable batteries is such that they are much less expensive to use than non-rechargeable batteries. A typical battery charger supplies a constant current to a battery or battery pack to charge the battery cells contained therein. The charger contains power conversion circuitry, current regulation control circuitry, and charge control circuitry. Although the charger can precisely regulate its output current, it has no control over how the current is distributed once it leaves the charger. That presents a problem in some systems.

The problem occurs when a load having a time varying current demand is also connected to the battery, as is illustrated in FIG. 1. There is illustrated therein a block diagram of a prior art battery charging system having a load 10 coupled in parallel to a battery, or battery pack 12 being recharged by a charger 14. The charger is coupled to the battery pack through a positive terminal 15 and a negative terminal 17, and provides an output current $I_o$ in the direction of arrow 16. If the load is drawing current, then the output current is divided between a charge current $I_c$ in the direction of arrow 18 and a load current $I_l$ in the direction of arrow 20. $I_c$ is that portion of the output current that passes through the battery cells in the battery pack. The sum of the load current and the charge current is equal to the output current $I_o$. Additionally, the battery pack may comprise an information resistor 22, coupled between an information terminal 24 and the negative terminal, as is known in the art, for indicating a battery classification to the charger.

If the load current is fixed and known before designing the charger, then the charger can be designed so that the battery is recharged at a preferred current level. However, most devices such as, for example, portable two way radios, have different levels of current demand for various modes of operation. A radio in "transmit" mode draws much more current than a radio in "standby" mode, and so it is with many other devices. In a system where the charger supplies a constant current, the battery is therefore not charged at a constant current due to the time varying current demand of the device. This tends to interfere with the recharging regime and the ability to precisely determine the state of charge of the battery by the charger.

The problem becomes more significant during the maintenance, or "trickle" charge period following a rapid charge cycle, and with overnight chargers. In both instances a low level of current is provided to the system. In trickle charging, the battery has been mostly charged, and a low level current is used to "top off" the battery charge. Overnight chargers only apply a low level current, and take much longer to recharge a battery. However, in most of these chargers, the load may be attached to the battery and drawing current during the charging process. If it is assumed that the load is present and operating, and a higher level of current is provided to compensate, then, when the load is not present, or not drawing current, the charger would be applying too much current to the battery, and the battery may become damaged. This is particularly true of nickel-metal hydride type battery cells since they are particularly sensitive to overcharging. On the other hand, if the current level is kept low to avoid overcharging, it is often the case that the current demand of a load is greater than the current supplied by the charger during trickle charging, and therefore the battery actually discharges after finishing a rapid charge cycle.

To solve this problem, it is necessary for the charger to be informed as to the division of its output current. If the charger can detect the level of either the charge current or the load current, then the output current can be precisely adjusted to maintain constant current through the battery cells. Therefore, there exists a need for a system in which a charger, which supplies current to a battery pack for recharging the battery cells contained therein, and to which a load having a time varying current demand is connected, is informed of the level of the charge current so as to maintain the charge current at a predetermined constant level.

BRIEF DESCRIPTION OF THE DRAWINGS

FIG. 6 is graphical representation of output, charge, and load current vs. time in a charging system in accordance with the invention.

DETAILED DESCRIPTION OF THE PREFERRED EMBODIMENT

Figure 1:
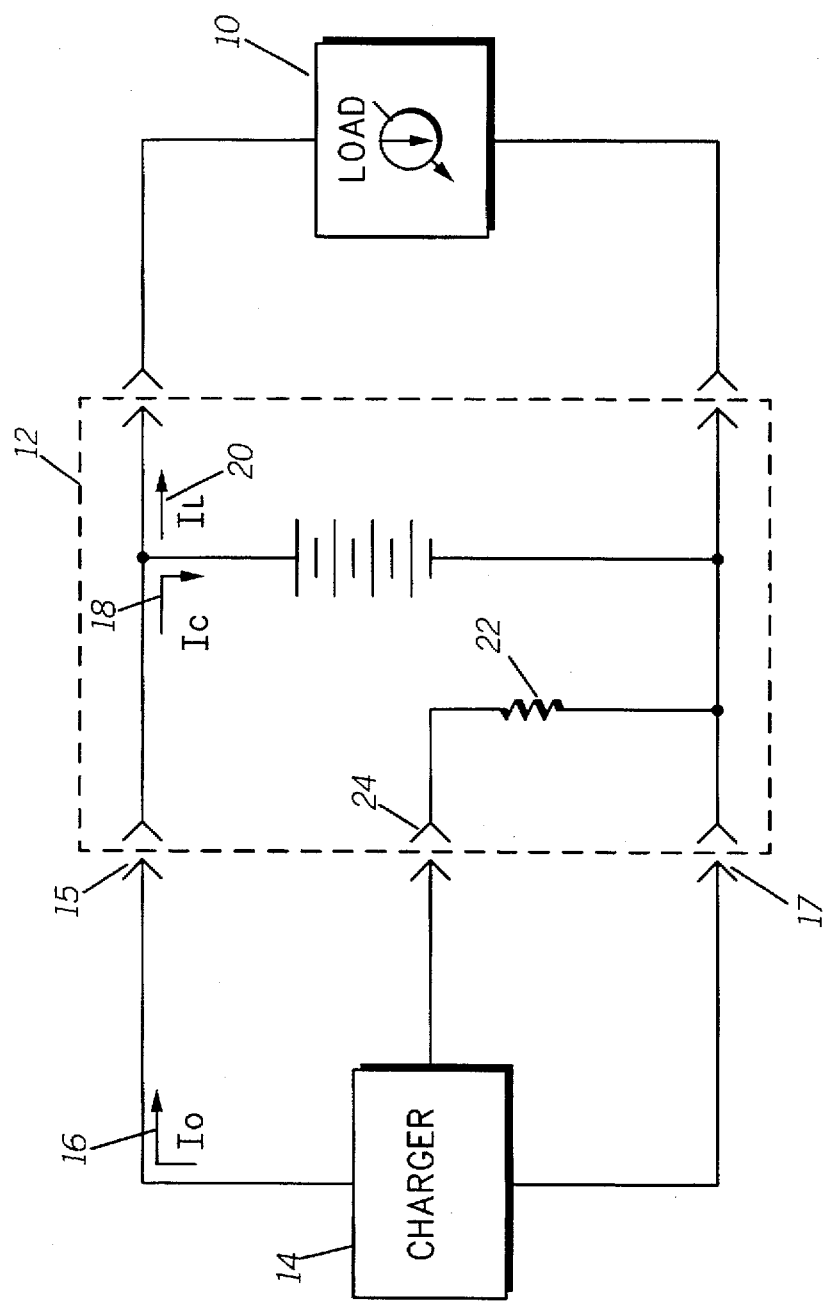
FIG. 1 is a block diagram of a prior art charging system.

While the specification concludes with claims defining the features of the invention that are regarded as novel, it is believed that the invention will be better understood from a consideration of the following description in conjunction with the drawing figures, in which like reference numerals are carried forward.

Figure 2:
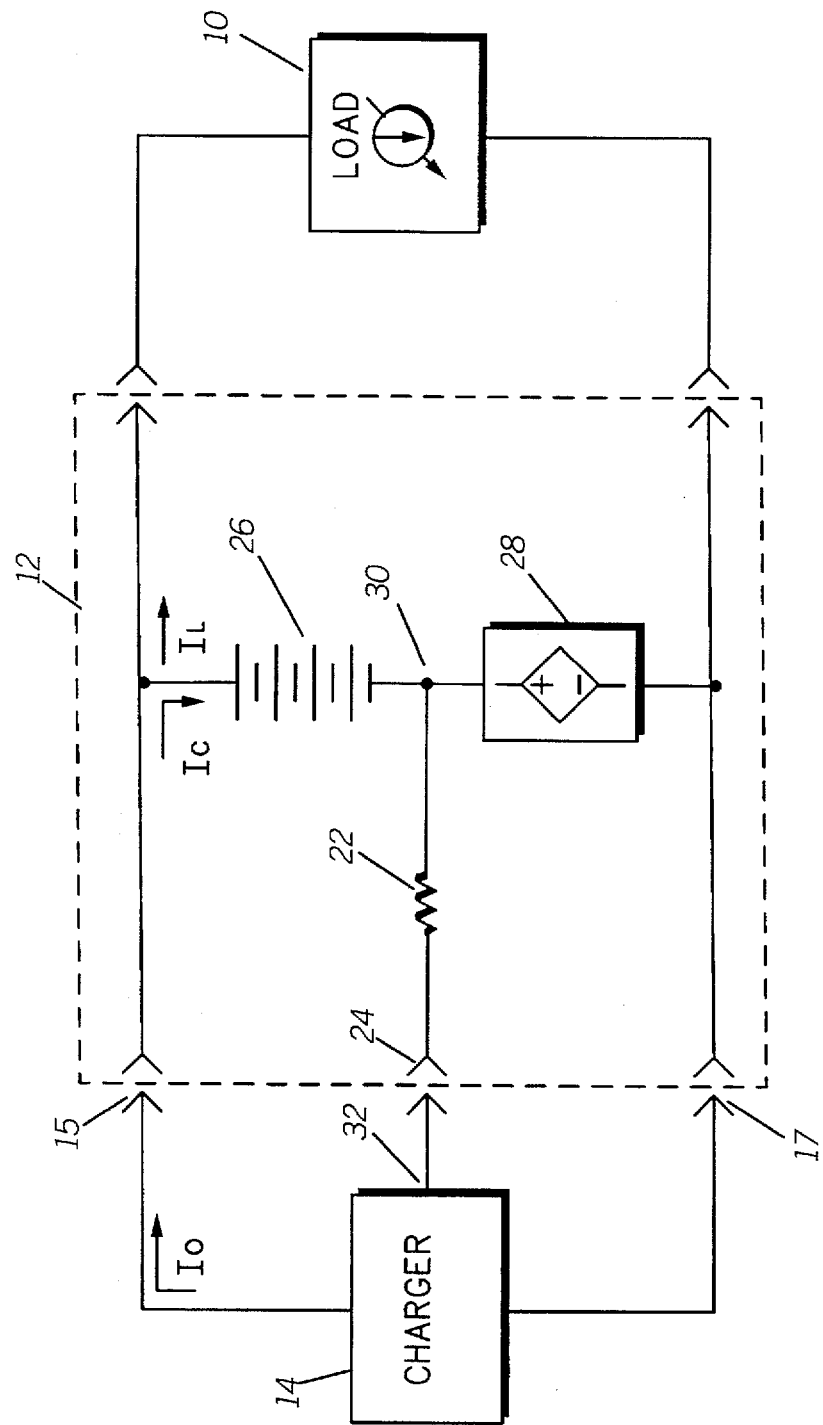
FIG. 2 is a block diagram of a battery pack and charging system in accordance with a first embodiment of the invention.

Referring now to FIG. 2, there is illustrated therein is a block diagram of a battery pack 12 and charging system in accordance with a first embodiment of the invention. In the system there is a charger 14 coupled to the battery pack by a positive terminal 15 and a negative terminal 17. The battery pack and charger are connected in parallel with a load 10 that has a time varying current demand. The battery pack 12 comprises at least one battery cell 26 and a current sensor 28 coupled in series between the positive terminal and the negative terminal, and thereby defining a sense node 30. Additionally, an information resistor 22, such as a code resistor for indicating a battery classification, coupled between the sense node and an information terminal 24 may be used. If the information resistor 22 is not present, the sense node is directly coupled to the information terminal.

When a charge current $I_c$ passes through the battery cell or cells, the current sensor generates a DC voltage level indicative of the level of the charge current. It may be proportional, as a sense resistor would provide, or it may be logarithmic, as a diode would provide. In general, the DC level is a function of the charge current. In addition, the information resistor 22 is used initially to provide information to the charger such as, for example, the battery capacity. Since such information is only initially necessary for charging, the information resistor and the current sensor may use the same line to provide information to the charger. Here they both use the information terminal 24. When the battery pack is first connected to the charger, charge current is not immediately applied and so there is no voltage at the sense node 30. The charger switches between two states. Initially it applies a bias current to the information terminal to cause a voltage level to appear across the information resistor. This voltage level, which is an information signal, corresponds to a battery classification, and is referenced to a set of voltage ranges defined and stored in a memory device in the charger. Each voltage range corresponds to a specific battery classification, and the charger begins charging at a preselected current level appropriate for the particular battery classification. This method of informing a charger of a battery classification is known in the art. The classification can correspond with, for example, battery capacity, chemistry, and other battery parameters. After determining the battery classification, the charger switches to a second state and provides an output current. The current sensor produces a DC voltage level in response to the charge current, which is fed through the information resistor to the charger. In the second state, the input 32 to the charger from the information terminal is a high impedance input so that virtually no voltage is lost across the information resistor, and substantially all of the voltage generated by the current sensor is available to the charger.

As mentioned briefly above, the DC voltage level provided by the current sensor indicates the level of the charge current. Since the charger sets an initial current level, it can compare the initial level of the output current $I_o$ with the charge current $I_c$. If the load 10 is drawing current, the charge current will be lower than the initial level, and the charger will increase its output current to a level where the charge current is at the intended level. If the load current then drops, the charge current will tend to increase, and the charger will again correct its output current to maintain the charge current at a substantially constant level.

By sensing current through the battery cells in this way, the charge current can be maintained at an appropriate level. Thus, the problems associated with the prior art are obviated. In particular, the undesirable effects of a non-constant current, and the problem of discharging the battery during the maintenance, or trickle charge period can be eliminated. However, the placement of the current sensor in series with the battery cell or cells introduces a new problem. Upon removal of the battery pack from the charger, and subsequent activation of the load, a discharge current is drawn from the battery cell or cells in the opposite direction of $I_c$ and the voltage provided by the battery cells will be divided between the load and the current sensor. In this sense the current sensor "steal" voltage from the load, and it would be preferable to eliminate such a loss.

Figure 3:
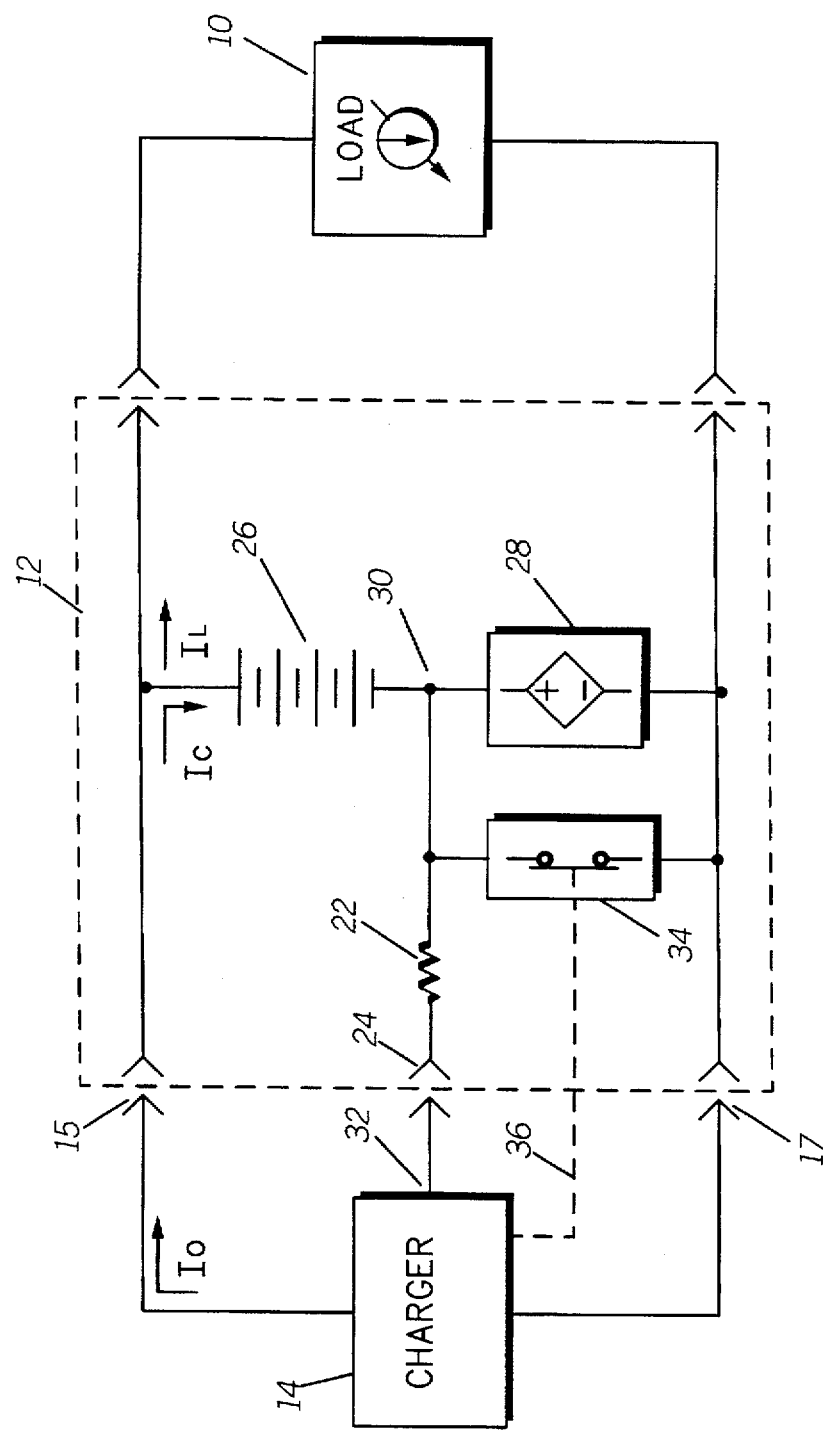
FIG. 3 is a block diagram of a battery pack and charging system in accordance with a second embodiment of the invention.

To eliminate the voltage drop across the current sensor during discharge of the battery pack, some additional circuitry is required, as shown in FIG. 3. Referring now to FIG. 3, there is illustrated therein a block diagram of a battery pack 12 and charging system in accordance with a second embodiment of the invention. To eliminate the unnecessary voltage drop otherwise created by the current sensor 28, a switch means 34 is coupled in parallel with the current sensor. The switch means is responsive to the charger 14 by some control signal 36, and is normally closed so that the current sensor is effectively short circuited, and thus removed from the discharge path. Upon connection with the charger, the switch means is opened so that current through the battery cells must go through the current sensor. There are numerous ways in which to implement such a switch means, and several are discussed hereinbelow.

Figure 4:
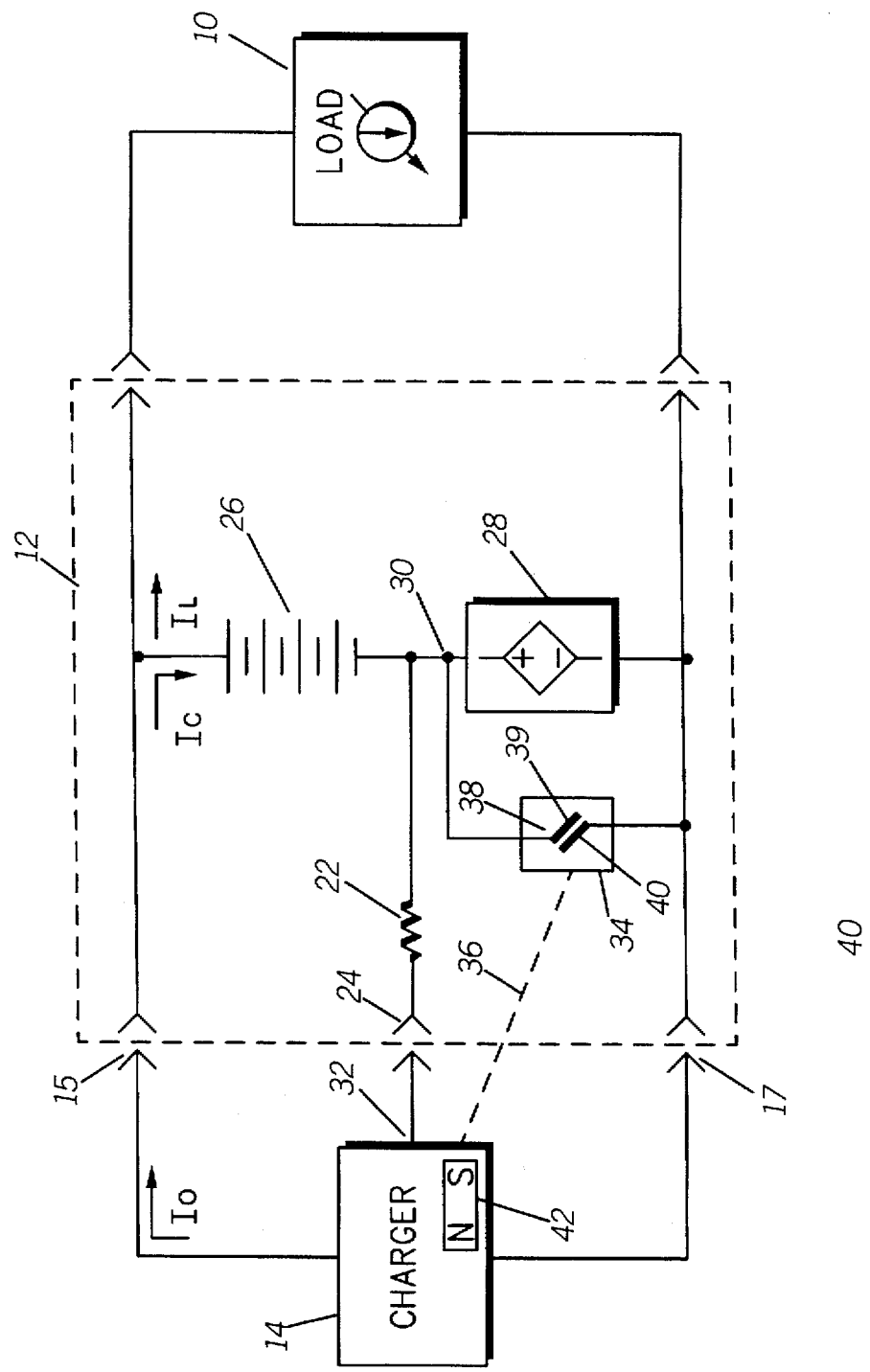
FIG. 4 is a block diagram of a more particular battery pack and charging system in accordance with a second embodiment of the invention.

A first possible switch means is shown in FIG. 4. Referring briefly to FIG. 4, there is illustrated therein a block diagram of a battery pack 12 and charging system in accordance with a second embodiment of the invention, specifically a normally closed reed switch 38 is coupled in parallel with the current sensor 28. In one particular embodiment of the invention it is contemplated that the normally closed reed switch is comprised of a thin ferrous conductor reed 40 which is biased into contact with a non-ferrous conductor reed 39. A magnet 42 located in the charger provides a magnetic field which acts as a control signal 36, and displaces the ferrous reed away from the non-ferrous reed, thereby opening the switch. Upon removal from the charger, the reed switch closes and removes the current sensor from the discharge path.

Figure 5:
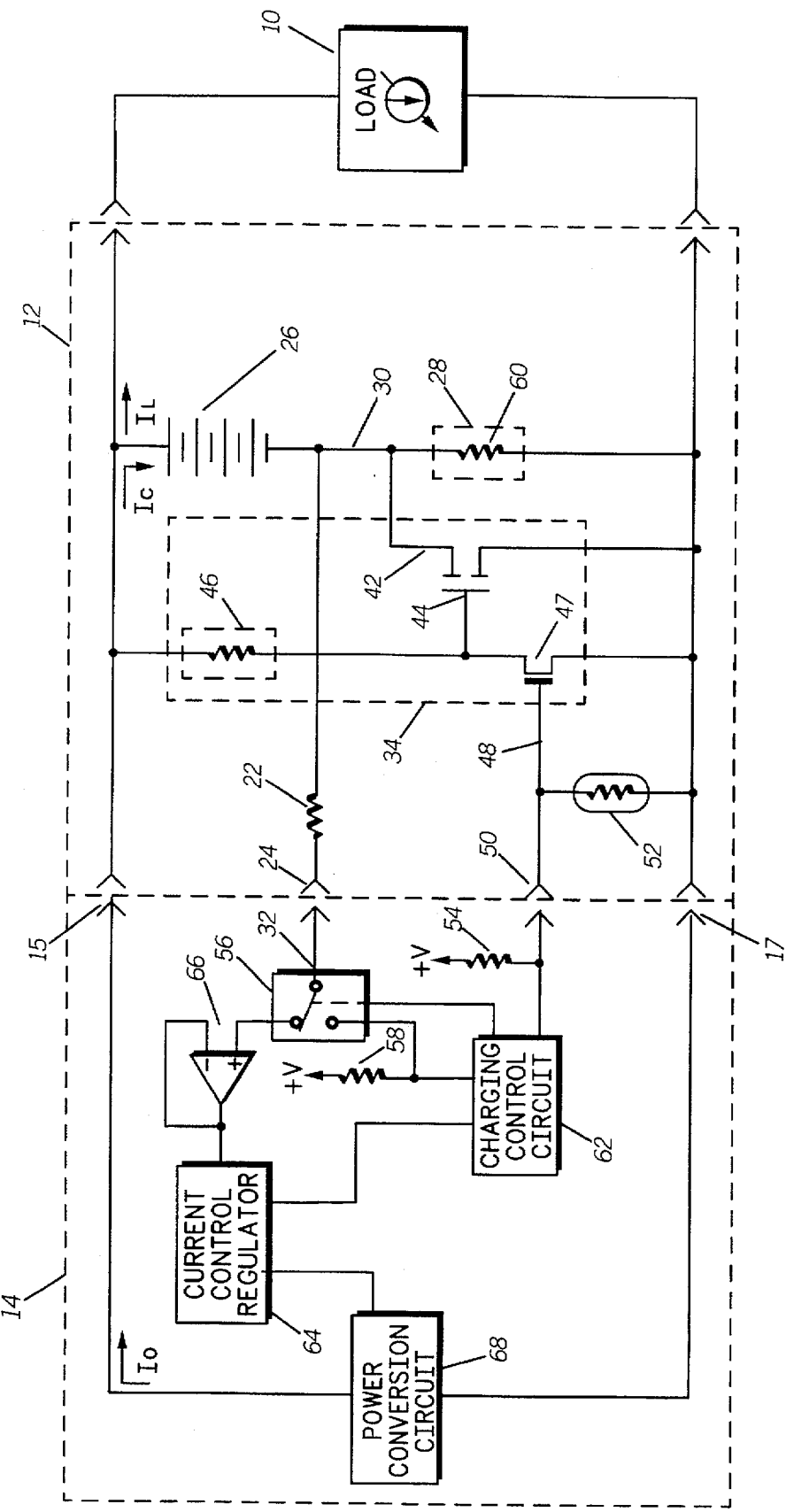
FIG. 5 is a block diagram of a battery pack and charging system in accordance with a third embodiment of the invention.

While this type of switch is effective, it is generally not reliable enough to ensure proper operation throughout the life of the battery pack. Therefore a more preferred circuit is shown in FIG. 5. Referring now to FIG. 5, there is illustrated therein a block diagram of a battery pack 12 and charging system in accordance with a third embodiment of the invention. Here an electronic switch means 34 is employed. The switch means comprises a first transistor 42 coupled in parallel with the current sensor and having a first control terminal 44, a bias network 46 coupled to the first control terminal for biasing the first transistor to a conductive state, and a second transistor 47 coupled between the first control terminal and the negative terminal 17 and having a second control terminal 48 coupled to a second information terminal 50. In the particular embodiment shown, the information resistor 22 is a first information resistor, and a second information resistor 52 is coupled between the second information terminal 50 and the negative terminal 17. Although the second information resistor may be used to indicate a second battery parameter or classification, in the preferred embodiment it is a thermistor for indicating a battery temperature of the battery pack during charging in a manner known in the art. In addition, the second information terminal also serves to control the electronic switch means.

In operation, while the battery is not connected to the charger, the bias network, preferably a simple pull-up resistor, biases the first transistor into a closed, or conductive state. The first transistor may be an N-channel MOSFET (metallic oxide semiconductor field effect transistor). While the battery is not connected to the charger, no voltage is applied to the second information terminal, and so the second information resistor pulls the second control terminal to a low voltage level since it is connected to the negative terminal 17. The second transistor 47 is also preferably an N-channel MOSFET, and while the second control terminal is at a low voltage level, the second transistor is in an open, or non-conductive state.

When the battery pack of FIG. 5 is connected to the charger 14, a pull-up resistor 54, or equivalent, in the charger provides a voltage to the second information terminal 50, and thereby biases the second transistor 46 to a closed, or conductive state. Since the control terminal of the first transistor is connected to the second transistor, once the second transistor switch closes, the bias provided by the bias network 46 is removed from the first control terminal, thereby causing the first transistor to open, or become nonconductive. As a result, charge current is forced to flow through the current sensor. At the same time, information may be received over the second information terminal such as, for example, battery temperature information from the thermistor 52.

The charger, prior to applying any current, uses, for example, an analog multiplexer 56 to switch voltage through a pull-up resistor 58 to the first information terminal 24. In the preferred embodiment the current sensor 28 is a sense resistor 60 which has a low value preferably in the range of 0.05 ohms–2.0 ohms. A voltage divider is formed by the pull-up resistor 58, first information resistor 22, and sense resistor 60. However, the first information resistor 22 and pull-up resistor 58 have a much greater resistance so the effect of the sense resistor on the voltage divider is negligible. The voltage at the first information terminal indicates the battery classification, which may include indicating capacity, chemistry, or both. This voltage is read by the charging control circuit 62 which then determines the appropriate output current level, and sends a control signal to a current control regulator 64. The current control regulator uses this information to set an initial value of output current. Thereafter, the analog multiplexer 56 switches the input 32 to be connected with a voltage follower circuit 66, or equivalent, which provides a high impedance input. The current control regulator controls a power conversion circuit 68 to begin providing an output current level to the battery pack at the initial level. Some or all of the output current will flow through the battery cells and sense resistor, which produces a voltage at the sense node 30. Since the first information terminal 24 is connected to the high impedance input of the voltage follower, there is virtually no voltage across the first information resistor 22, and the voltage at the input of the voltage follower is substantially the same as at the sense node 30. The voltage follower then provides the same voltage level to the current control regulator, which compares the voltage level with the initial value. If the voltage level indicates the current through the cells is lower than the initial value, as when the load is drawing current, it controls the power conversion circuit to increase the output current level until the appropriate level of charge current is reached. If the level is too high, the current control regulator controls the power conversion circuit to decrease the output current level until the correct charge current level is reached. The current sensor becomes at least part of the feedback circuit for controlling output current levels. In this way the charge current is maintained at an optimum level, and the charging process is undisturbed by the activity of the load.

Therefore, the instant invention provides for the generation of a signal indicative of a charge current through the battery cells so that the charger may compensate for discrepancies caused by an active load. Further, it also provides for a means by which the generator of the signal, the current sensor, is removed from the discharge circuit of the battery cells and the load when the battery pack is removed from the charger. Still further it provides for use of the invention with common battery pack elements such as information resistors for indicating battery classification and temperature. It will be known to those skilled in the art that use of information resistors are an unnecessary component to practice many embodiments of the invention. It is a trivial task to remove, for example, the first information resistor as described, and simply replace it with a conductor. Such would be the case if only one style of battery pack existed for use with a particular charger. In other words, when there is no need to provide information to the charger, as when there is only one style of battery pack, there is no need to indicate a battery classification.

In a preferred embodiment, the invention also provides for a charging system for powering a load having a load current which varies with time while charging a battery pack. The system comprises at least one battery cell and a current sensor coupled in series between a positive terminal and a negative terminal of the battery pack, thereby defining a sense node. The current sensor provides a DC voltage level indicative of a charge current through the at least one battery cell. The preferred battery pack further comprises a code resistor as the first information resistor, which is coupled between the sense node and a first information terminal. The system further comprises a charger, for providing the charge current and powering the load, which is switchable between a first operating mode wherein the charger measures the code resistor to determine a battery classification, and a second operating mode wherein the charger measures the DC voltage level to adjust an output current level such that said charge current is held constant as the load current varies.

Referring now to FIG. 6, there is illustrated therein a graph of current vs. time for the output current 70 of the charger, the load current 72 and the charge current 74 in a charging system in accordance with the invention. The load is connected to the battery pack at time t=0, the origin of each graph, drawing a time varying current 76, and at the same time the charger detects the battery pack and begins charging. The output current level 78 quickly increases to an initial value 80 set by the current control regulator circuit. Shortly thereafter, at time $t_1$, the charger detects a discrepancy between the charge current 82, and the initial value, and increases the output current to correct for the deficiency. The output current then, at $t_2$, is equal to the initial value plus the load current. At some time after $t_2$ the load current may change. The change may be gradual, or a step change, as indicated by a pulse 84, during which time the charger senses the tendency of the charge current to decrease, and increases the output current by a similar pulse 86. This continues as long as the battery pack is connected to the charger, and even when the charge current is to be brought to a low, or zero current level, the charger can detect load current, and ensure that the battery pack is not discharged while connected to the charger. Although shown here in a constant current charging application, it will be readily apparent to one having ordinary skill in the art that any current profile may be provided by the charger, and a charging system in accordance with the invention may be used to keep the charge current at a correct level, even if it the preferred charge current is a time varying one.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery pack having a positive terminal and a negative terminal, said battery pack comprising:

at least one battery cell and a current sensor coupled in series between said positive terminal and said negative terminal, thereby defining a sense node;

said current sensor providing a DC voltage level indicative of a charge current through said at least one battery cell, and providing said DC voltage level to a charger; and a first information resistor, coupled between said sense node and a first information terminal.

2. A battery pack as defined by claim 1, wherein said current sensor is a sense resistor.

3. A battery pack as defined in claim 1, wherein said first information resistor is a code resistor for indicating a battery classification.

4. A battery pack as defined in claim 1, further comprising a second information resistor coupled between a second information terminal and said negative terminal.

5. A battery pack as defined in claim 4, wherein said second information resistor is a thermistor for providing a signal indicative of a battery temperature to said charger.

6. A battery pack as defined by claim 1, further comprising a switch means, responsive to said charger, coupled in parallel with said current sensor.

7. A battery pack as defined by claim 6, wherein said switch means is a normally closed reed switch, said charger produces a magnetic field, said magnetic field opening said normally closed reed switch when said battery pack is connected to said charger.

8. A battery pack as defined by claim 6, further comprising:
a second information resistor coupled between a second information terminal and said negative terminal and wherein said switch means comprises:
a first transistor coupled in parallel with said current sensor and having a first control terminal;
a bias network coupled to said first control terminal for biasing said first transistor to a conductive state; and
a second transistor, coupled between said first control terminal and said negative terminal, having a second control terminal coupled to said second information terminal.

9. A battery pack as defined by claim 8, wherein said second information resistor is a thermistor for providing a signal indicative of a battery temperature to said charger.

10. A battery pack having a positive terminal and a negative terminal, said battery pack comprising:
at least one battery cell and a sense resistor coupled in series between said positive terminal and said negative terminal, thereby defining a sense node;
said sense resistor providing a DC voltage level proportional to a charge current through said at least one battery cell; and
a switch means, responsive to a control signal from a charger, coupled in parallel with said sense resistor, said switch means being normally closed until receiving said control signal from said charger; and
a first information resistor, coupled between said sense node and a first information terminal.

11. A battery pack as defined by claim 10, further comprising:
a second information resistor coupled between a second information terminal and said negative terminal and wherein said switch means comprises:
a first transistor coupled in parallel with said sense resistor and having a first control terminal;
a bias network couple between said first control terminal and said positive terminal; and
a second transistor coupled between said first control terminal and said negative terminal and having a second control terminal coupled to said second information terminal.

12. A battery pack as defined by claim 11, wherein said first information resistor is a code resistor for indicating a battery classification, said second information resistor is a thermistor for providing a signal indicative of a battery temperature to said charger.

13. A battery pack as defined by claim 10, wherein said switch means is a normally closed reed switch, said charger produces a magnetic field, said magnetic field opening said normally closed reed switch when said battery pack is connected to said charger.

14. A battery charging system for powering a load with a load current, said load current changing with time, said battery charging system comprising:
a battery pack comprising:
at least one battery cell and a current sensor coupled in series between a positive terminal and a negative terminal, thereby defining a sense node, said current sensor providing a DC voltage level indicative of a charge current through said at least one battery cell;
a code resistor coupled between said sense node and a first information terminal; and
a charger, for providing said charge current and powering said load, and switchable between a first operating mode wherein said charger measures said code resistor to determine a battery classification, and a second operating mode wherein said charger measures said DC voltage level to adjust an output current level such that said charge current is held constant as said load current changes.

15. A battery charging system as defined by claim 14, wherein said current sensor is a sense resistor.

16. A battery charging system as defined in claim 14, wherein said battery pack further comprises a thermistor coupled between a second information terminal and said negative terminal.

17. A battery charging system as defined in claim 14, wherein said battery pack further comprises a switch means, responsive to said charger, coupled in parallel with said current sensor.

18. A battery charging system as defined in claim 17, wherein said switch means is a normally closed reed switch, said charger produces a magnetic field, said magnetic field opening said normally closed reed switch when said battery pack is connected to said charger.

19. A battery charging system as defined in claim 17, wherein said battery pack further comprises:
a thermistor coupled between a second information terminal and said negative terminal; and
wherein said switch means comprises:
a first transistor coupled in parallel with said current sensor and having a first control terminal;
a bias network coupled to said first control terminal for biasing said first transistor to a conductive state; and
a second transistor, coupled between said first control terminal and said negative terminal, having a second control terminal coupled to said second information terminal.

20. A battery pack having a positive terminal and a negative terminal, said battery pack comprising:
at least one battery cell and a sense resistor coupled in series between said positive terminal and said negative terminal, thereby defining a sense node;
said sense resistor providing a DC voltage level proportional to a charge current through said at least one battery cell; and
a switch means, responsive to a control signal from a charger, coupled in parallel with said sense resistor, said switch means being normally closed until receiving said control signal from said charger.

21. A battery pack as defined by claim 20, wherein said battery pack further comprises a first information resistor, coupled between said sense node and a first information terminal.

* * * * *